United States Patent [19]
Lohr, Jr. et al.

[11] 3,928,282
[45] Dec. 23, 1975

[54] BLEND OF HIGH-VINYL POLYBUTADIENE AND HYDROFORMYLATED HIGH-VINYL POLYBUTADIENE

[75] Inventors: Delmar F. Lohr, Jr., Akron; Jung W. Kang, Clinton, both of Ohio

[73] Assignee: The Firestone Tire & Rubber Company, Akron, Ohio

[22] Filed: Sept. 9, 1974

[21] Appl. No.: 504,648

[52] U.S. Cl. ...... 260/42.44; 260/42.37; 260/94.7 A; 260/894
[51] Int. Cl.² .................... C08K 9/06; C08L 9/00
[58] Field of Search ........... 260/894, 94.7 A, 42.44, 260/85.1, 42.37

[56]  References Cited
UNITED STATES PATENTS

| | | | |
|---|---|---|---|
| 3,083,175 | 3/1963 | Safford et al. | 260/94.2 M |
| 3,311,598 | 3/1967 | Mertzweiller et al. | 260/85.1 |
| 3,314,911 | 4/1967 | Cull | 260/94.7 A |
| 3,318,972 | 5/1967 | Mertzweiller et al. | 260/85.1 |
| 3,383,426 | 5/1968 | Cull et al. | 260/94.7 A |
| 3,443,620 | 5/1969 | Vanderbilt et al. | 152/330 |
| 3,635,933 | 1/1972 | Schaffhauser et al. | 260/94.7 A |

Primary Examiner—Donald E. Czaja
Assistant Examiner—H. H. Fletcher

[57] ABSTRACT

Blends of hydroformylated polybutadiene resin of high 1,2-configuration with polybutadiene resin of high 1,2-configuration give a cured thermosetting resin of improved thermooxidative resistance. The blends may also include silica as filler and a vinyl silane as bonding agent.

2 Claims, No Drawings

BLEND OF HIGH-VINYL POLYBUTADIENE AND HYDROFORMYLATED HIGH-VINYL POLYBUTADIENE

FIELD OF THE INVENTION

This invention relates to a blend of (1) a resin of polybutadiene of high vinyl content and (2) hydroformylated high-vinyl polybutadiene. The cured thermosetting resin prepared from the blend has increased resistance to thermooxidative deterioration of mechanical properties.

BACKGROUND OF THE INVENTION

Butadiene homopolymer resins containing a high proportion of butadiene units incorporated in 1,2-configuration, have come into considerable use for the production of molded products, particularly as electrically insulating structural components, friction elements and the like. Particularly since these resins exhibit good mechanical properties, at least initially, at high temperatures, they are attractive candidates for applications in which they will be exposed to high temperatures. They are preferred to polybutadiene resins of lower vinyl contents of, for example 0 to 70 per cent because the latter require excessively long cure times to obtain desirable physical properties.

At temperatures above about 600° F. (316° C.), however, the mechanical properties of these resins tend to slowly degrade over a period of time, which prevents their use in many applications for which they would otherwise be very suitable. To date, however, there does not appear to have been any successful development of enhanced heat-resistant resins of this type. Heat stabilizers may be added to the resins, but this is apt to degrade their desirable physical properties.

Accordingly, it is an object of this invention to provide a resin blend of high-vinyl content with improved resistance to thermooxidative degradation.

THE PRIOR ART

Polybutadiene having a high content of the butadiene repeating units in the 1,2-configuration is well-known in the art.

Hydroformylation of polymers is disclosed in U.S. Pat. Nos. to Slaugh 3,168,553, Slaugh et al. 3,239,569, Mertzweiller et al. 3,310,576, Cull et al. 3,383,426

SUMMARY OF THE INVENTION

Resins of polybutadiene in which a high percentage of the repeating butadiene units are in the 1,2-configuration are rendered more stable at high temperatures by blending with them hydroformylated polybutadiene in which a high percentage of the repeating units are in the 1,2-configuration. These blends are useful insulation for electrical units and a variety of other molded products.

The resin blends are composed of (1) resins of butadiene homopolymer having substantially 80 per cent or higher of the repeating butadiene units in the 1,2-configuration with (2) butadiene homopolymers of the same general microstructure which have been hydroformylated. By hydroformylation, it is meant that the butadiene homopolymer has been reacted with hydrogen and carbon monoxide in the presence of selected catalyst. A more detailed description of the hydroformylation process is presented below.

The butadiene homopolymers are usually prepared by polymerizing butadiene-1,3 by means of anionic catalysts to a relatively low molecular weight, say 1,000–200,000, so that they are of at least a flowable consistency. The homopolymer may them be hydroformylated as will be described in detail and the polybutadiene homopolymer blended with the hydroformylated polymer in weight ratios of about 5/95 to 95/5. Because of the additional cost of hydroformylation, blends containing about 5 to 45 weight per cent hydroformylated polybutadiene homopolymer are preferred.

These low molecular weight polymer blends are then incorporated with any desired fillers, reinforcing fibers or fabrics, pigments, etc., peroxide (or other curing agent, if desired), etc., and the composite is cured under heat and pressure to produce the desired finished article.

For good processibility and good flow during molding the average molecular weight of each resin in the blend is preferred to be about 55,000. The resin should have a dilute solution viscosity of 0.05–0.7, preferably 0.1–0.6. The butadiene units in the homopolymer are incorporated into the polymeric chain largely in the 1,2-configuration, preferably at least 80 per cent of the butadiene units present being in this configuration.

These resin blends are cured by incorporating, per 100 parts of the blend, approximately 0.5–6 parts, and preferably 1.5–3.0 parts, by weight, of dicumyl peroxide (or an equivalent weight of any other peroxide giving radicals of the structure $R_2(CH_3)CO$ where R independently in each occurrence represents a hydrocarbon radical of 1–20 carbon atoms), and heating the polymers, usually under pressure. The curing temperature is advantageously at least 250° F. (121° C.), preferably about 300°–350° F. (149°–177° C.). Generally, no advantage in the process or product is obtained by exceeding a temperature of 420° F. (216° C.). Obviously, the higher the temperature the shorter will be the curing time required. Generally at 350° F. (177° C.) a satisfactory cure is obtained in less than four minutes, and in some cases even within a few seconds. Cure times of more than four minutes usually provide no added advantage. Where fast cures are desired, it is necessary to use a filler to avoid crazing or cracking. A filler, such as silica, is advantageously used in the proportion of 25–65, preferable 40–60, volume per cent based on the combined resinfiller composition. Also the resins may be filled with glass fiber, either as chopped filler or else as glass fabric in a laminate, in which case the glass fiber will serve the purpose of a filler in preventing crazing and cracking on fast cures. Other additives such as plasticizers, etc. may be added. Generally, antioxidants will not be required.

More particularly with regard to the inclusion of fillers, the blends of the present invention may be stabilized by the incorporation of silica fillers in amounts of 100 to 500 parts by weight per 100 parts by weight of the polymer blend. In such cases it is desirable to include 0.05 to 2.0 parts per 100 parts of silica of an agent for bonding the filler to the resin such as an unsaturated-group-containing silane on the order of vinyl triacetoxysilane, vinyl tributoxy silane, vinyl trimethoxysilane, and vinyl triethoxysilane.

It will usually be desirable to include 0.5 to 5 per cent by weight of a metal soap, based on the weight of the blend. This may be any Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

THE HYDROFORMYLATED POLYMER

As stated previously, hydroformylated polybutadiene polymers are prepared by effecting a reaction of the polymer with hydrogen and carbon monoxide. The site of reaction is believed to be at the pendant vinyl groups present in the high 1,2-microstructure polybutadiene.

The reaction may be illustrated as follows; however, side reactions such as cyclization may occur; therefore, we do not intend to be limited by theory as to the exact ratios of carbonyl, hydroxyl and cyclic structures that are present.

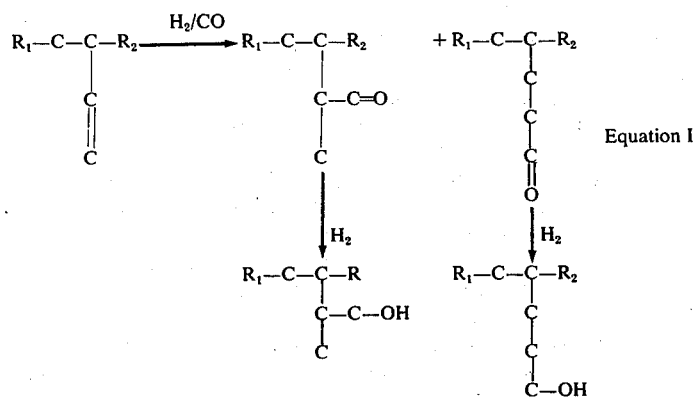

Equation I

As shown by Equation I the initial reaction is the formation of carbonyl functions which can further react with hydrogen to form hydroxyl groups. The exact mechanism for cyclization is not completely understood at this time; therefore, no attempt is made to present an equation illustrating the reaction.

A detailed description of the hydroformylation reaction follows:

A solution of 20 per cent 1,2-polybutadiene (300 gms. 0.2 DSV) in toluene was charged into a one-gallon stainless steel reactor equipped with a temperature-controlling device, a stirrer and sampling exit ports. The microstructure of the 1,2-polybutadiene is summarized in table I under the heading of "Control." The reactor was flushed with hydrogen and mixed gas of hydrogen-carbon monoxide. To the polymer cement were charged a solution of $Co_2(CO)_8$ and tri-n-butyl-phosphine in toluene. The concentration of $Co_2(CO)_8$ may be varied over a range of 1mM (millimole) to 50 mM per 100 grams of polymer. The preferred range is 5 to 10 mM. The ratio of tri-n-butylphosphine to $Co_2(CO)_8$ is usually 4 but may be in the range of about 2 to 10. The reactor was then pressured to 150 psig with mixed gas of hydrogen-carbon monoxide (2:1) at room temperature and heated to 300°–320° F. The pressure may vary over wide limits, say 50 to 1,500 psig; the preferred range being 100 to 200 psig. The ratio of hydrogen to carbon monoxide may also vary over relatively wide limits of about 95/5 to 5/95; the preferred range being 50/50 to 90/10. The usual or preferred reaction temperature is about 200° F. but somewhat lower or higher temperatures may be used. The reduction of pressure in the reactor was clearly observed at 320° F. which is indicative of the hydroformylation reaction taking place. After the reaction was carried out under the different conditions, (shown in Table I) the reactor was cooled to room temperature and then the reactor contents were transferred into the 28 oz. beverage bottle. The red polymer solution was evaporated to remove the solvent under vacuum and the reddish polymer obtained was dried at 50° C. under vacuum. The specific reaction conditions and analytical results on the hydroformylated polymers are shown in Table I. The carbonyl content may vary from 0.1 to 10.0 weight per cent and the hydroxyl content may vary from 0.1 to 10 milliequivalents/grams (meq/g).

TABLE I

| Catalyst[a] | | Initial | React. | React. | IR Spectra; % | | | Total | CHO[c] | OH | | | Tg |
|---|---|---|---|---|---|---|---|---|---|---|---|---|---|
| $Co_2(CO)_8$ mM | P(n-Bu)$_3$[b] mM | H$_2$/CO(2:1) psig | Temp. °F | Time Hrs. | 1,4- Cis | 1,4- Trans | 1,2 | Found | wt% | meq/g | DSV | Gel | °C |
| Control Resin A | — | — | — | — | — | 3.5 | 1.0 | 95.5 | 100.7 | — | — | 0.2 | 0 | −8 |
| Resin B | 5 | 20 | 150 | 320 | 4 | 0 | 39.5 | 60.4 | 12.1 | — | 0.64,0.65 | 0.18 | 0 | −32 |
| Resin C[d] | 10 | 40 | 150 | " | 8 | 0 | 61.4 | 38.6 | 6.1 | 0.96 | 2.53,2.48 | 0.18 | 0 | −4 |
| Resin D | 10 | 40 | 150 | " | 1¼ | 0 | 44.6 | 55.6 | 11.4 | — | 0.73,0.72 | 0.17 | 0 | −29 |
| Resin E | 10 | 40 | 150 | 300 | 1¼ | 0 | 34.5 | 64.6 | 12.0 | 2.30 | 0.54,0.58 | 0.19 | 0 | −32 |

[a]0.1 Molar $Co_2(CO)_8$ in toluene; 1 M P(n-Bu)$_3$ in toluene.
[b]Tri-n-Butylphosphine.
[c]Based on propionaldehyde calibration in toluene.
[d]After the pressure on the reactor had reached to maximum at 320° F., the pressure of mixed gas (H$_2$/CO) was maintained through the system.

Although the hydroformylated resins listed in Table I were prepared with a catalyst system composed of cobalt octacarbonyl with tris(n-butyl)phosphine as a ligand, it will be apparent to one skilled-in-the-art that carbonyl derivatives of other Group VIII elements could be used as catalysts. Alkyl and/or aryl arsines and/or stilbenes could be used as a ligand as well as aryl phosphines.

CURED RESINS

The cured resins produced in accordance with this invention have exceptional resistance to thermooxidative deterioration of physical properties, particularly modulus and flexural strength upon long time exposure at high temperatures, i.e., temperatures above 400° F. and up to 700° F. Thus, the products, upon exposure to a temperature of 600° F. for 100 hours, will retain upwards of 90 per cent of their modulus and upwards of 80 per cent of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages shown in Table II are on the basis of weight, unless otherwise explicitly stated.

TABLE II

| Run No. | Control | 1 | 2 | 3 | 4 | 5 | 6 |
|---|---|---|---|---|---|---|---|
| Resin A | 100 | 90 | 80 | 90 | 90 | 80 | 80 |
| Resin B | 0 | 10 | 20 | 10 | 10 | 20 | 20 |
| Silica | 380 | 380 | 380 | 380 | 380 | 380 | 380 |
| Vinyltriacetoxy silane | 3 | 3 | 3 | 3 | 4.6 | 3 | 4.6 |
| Dicumyl peroxide | 3 | 3 | 3 | 5 | 3 | 5 | 3 |
| Calcium stearate | 3 | 3 | 3 | 3 | 3 | 3 | 3 |
| Flexural Strength psi | | | | | | | |
| Initial | 12100 | 9600 | 10400 | 10400 | 11400 | 12100 | 11900 |
| Aged* | 7300 | 8100 | 9500 | 9200 | 9500 | 10500 | 10500 |
| % Retained | 60 | 84 | 91 | 88 | 83 | 87 | 88 |
| Flexural Modulus, psi $\times 10^{-6}$ | | | | | | | |
| Initial | 1.40 | 1.41 | 1.34 | 1.34 | 1.54 | 1.65 | 1.43 |
| Aged* | 1.05 | 1.35 | 1.53 | 1.38 | 1.48 | 1.65 | 1.60 |
| % Retained | 75 | 96 | 114 | 103 | 96 | 100 | 112 |

*After 100 hours at 600° F. (316° C.)

Referring to Table II, all of the aged experimental cured compositions (Experiments Nos. 1 thru 6) had flexural strengths and moduli values greater than the properties of the aged control. The control contained Resin A which is described in Table I and did not contain Resin B. Resin B is a hydroformylated 1,2-polybutadiene the properties of which are also described in Table I. It should be noted that slight variation in the vinyltriacetoxysilane and dicumylperoxide concentrations did affect initial or non-aged properties slightly but in all cases the flexural strengths and moduli values of the experimental compositions containing a hydroformylated resin were significantly higher than the control values after oven-aging in a forced-air oven at 600° F. for 100 hours. The percent retention values indicate the degree of effectiveness of the hydroformylated resins in imparting improved thermooxidative properties.

We claim:

1. A blend of resin with a dilute solution viscosity of 0.05 to 0.7 and composed essentially of (a) 5 to 95 parts by weight of a resin of butadiene homopolymer in which at least 80 per cent of the repeating butadiene units are in the 1,2-configuration and (b) 95 to 5 parts by weight of hydroformylated butadiene homopolymer obtained from homopolymer in which at least 80 per cent of the repeating units are in the 1,2-configuration; the carbonyl content of the hydroformylated homopolymer varying from 0.1 to 10.0 weight per cent and its hydroxyl content varying from 0.1 to 10.1 meq per gram, and the molecular weight of each component of the blend being 1,000 to 200,000, together with (c) 100 to 500 parts by weight of silica and (d) 0.5 to 5 parts by weight of an unsaturatedgroup-containing silane silica-to-resin bonding agent, the parts by weight of the silica and bonding agent being based on 100 parts of the combined weights of the homopolymer and hydroformylated homopolymer.

2. The resin of claim 1 which includes 0.5 to 5 parts by weight of the bonding agent which is vinyl triacetoxysilane.

* * * * *